(12) United States Patent
Isenmann et al.

(10) Patent No.: US 12,164,880 B2
(45) Date of Patent: Dec. 10, 2024

(54) NETWORK DEVICE FOR DISTRIBUTING COMPUTING OPERATIONS BY DATA COMMUNICATION IN A NETWORK

(71) Applicant: VEGA Grieshaber KG, Wolfach (DE)

(72) Inventors: Andreas Isenmann, Haslach im Kinzigtal (DE); Clemens Hengstler, Haslach (DE); Florian Burgert, Gengenbach (DE)

(73) Assignee: VEGA Grieshaber KG, Wolfach (DE)

( * ) Notice: Subject to any disclaimer, the term of this patent is extended or adjusted under 35 U.S.C. 154(b) by 326 days.

(21) Appl. No.: 17/526,580

(22) Filed: Nov. 15, 2021

(65) Prior Publication Data

US 2022/0156042 A1 May 19, 2022

(30) Foreign Application Priority Data

Nov. 16, 2020 (DE) ...................... 10 2020 130 177.4

(51) Int. Cl.
*G06F 7/48* (2006.01)
*H04L 29/08* (2006.01)
*H04L 67/10* (2022.01)

(52) U.S. Cl.
CPC ................ *G06F 7/48* (2013.01); *H04L 67/10* (2013.01)

(58) Field of Classification Search
CPC .................................... G06F 7/48; H04L 67/10
See application file for complete search history.

(56) References Cited

U.S. PATENT DOCUMENTS

| | | | | |
|---|---|---|---|---|
| 8,812,262 B2* | 8/2014 | Grittke | .................... | G05B 9/02 |
| | | | | 702/182 |
| 9,122,387 B1* | 9/2015 | Freeman | ................. | G06F 17/11 |
| 9,791,282 B2* | 10/2017 | Ould-Ahmed-Vall | ..................... | |
| | | | | G08G 1/096844 |

(Continued)

OTHER PUBLICATIONS

Office Action issued Mar. 1, 2021 in corresponding German Patent Application No. 10 2020 130 177.4; 7 pages.

(Continued)

*Primary Examiner* — Nazia Naoreen
(74) *Attorney, Agent, or Firm* — Oblon, McClelland, Maier & Neustadt, L.L.P.

(57) ABSTRACT

A network device is provided for distributing computing operations via data communication in a network, the device including: a network interface device to connect the network device to the network; and a processor device to divide an arithmetic operation into partial arithmetic operations to be calculated locally and partial arithmetic operations to be calculated remotely, to locally calculate the partial arithmetic operations to be calculated locally, and to provide them as locally calculated partial arithmetic operations, the network interface device being further to send the partial arithmetic operations to be calculated remotely to the network and to receive them as remotely calculated partial arithmetic operations, and the processor device being further to calculate the arithmetic operation based on the remotely calculated partial arithmetic operations and the locally calculated partial arithmetic operations. A level measuring device, a method of distributing computing operations, and a nontransitory computer-readable storage medium are also provided.

10 Claims, 3 Drawing Sheets

(56) References Cited

U.S. PATENT DOCUMENTS

2011/0145180 A1* 6/2011 Muller ................. G05B 19/042
706/23

OTHER PUBLICATIONS

Lin, L. et al.: "Computation Offloading Toward Edge Computing", Proceedings of the IEEE 107 (8), Aug. 2019, pp. 1584-1607, DOI: 10.1109/JPROC.2019.2922285.
"Parallel computing". In: Wikipedia, the free encyclopedia. Bearbeitungsstand: Sep. 17, 2020. Sep. 17, 2020, pp. 1-22 URL: https://en.wikipedia.org/w/index.php?title=Parallel_computing&oldid=97884 7090 [abgerufen am Feb. 25, 2021].

* cited by examiner

NETWORK DEVICE FOR DISTRIBUTING COMPUTING OPERATIONS BY DATA COMMUNICATION IN A NETWORK

CROSS-REFERENCE TO RELATED APPLICATIONS

The present application claims priority to German Patent Application No. 10 2020 130 177.4, filed Nov. 16, 2020, which is incorporated herein by reference in its entirety.

FIELD

The invention relates to a network with distributed computing tasks. The invention further relates to network participants, for example sensors with APL interface, in a network sharing computing tasks.

BACKGROUND

Sensors and actuators are increasingly miniaturized and integrated into computer networks. Here, the requirements for the calculation of sensor and/or actuator data often increase.

SUMMARY OF THE INVENTION

It is an object of the invention to provide an improved organization of network subscribers and computing tasks at hand.

The present invention allows network participants, for example sensors with an APL interface, to share in a network computing tasks.

This task is achieved by the features of the independent patent claims. Further embodiments of the invention result from the subclaims and the following description of embodiments.

A first aspect of the invention relates to a network device for distributing computing operations by data communication in a network, the network device comprising: network interface means adapted to connect the network device to the network; a processor device which is configured to divide an arithmetic operation into partial arithmetic operations to be calculated locally and partial arithmetic operations to be calculated remotely, and to locally calculate the partial arithmetic operations to be calculated locally and to make them available as locally calculated partial arithmetic operations, wherein the network interface device is further configured to send the partial arithmetic operations to be remotely calculated to the network and to receive them as remotely calculated partial arithmetic operations; wherein the processor device is configured to calculate the arithmetic operations based on the remotely calculated partial arithmetic operations and the locally calculated partial arithmetic operations.

The present invention advantageously provides a network of devices (e.g., sensors) with a network interface to improve the distribution of computing operations. This network interface may be an APL interface or a W LAN interface.

All participants are connected to each other via a network, for example. Typically, network routers and/or network switches are used for this purpose.

The network nodes must perform arithmetic operations to output a result. These arithmetic operations can be split. The arithmetic operations may include, but are not limited to, addition, subtraction, multiplication, division, exponentiation, and extraction of roots. A network node has to perform an arithmetic operation and splits this operation into parts. It sends these partial operations to one or more of the connected network nodes. The partial operations are executed in parallel and sent back to the sender. The sender calculates the overall result from the partial results.

Advantageously, the present invention allows network subscribers to be provided with lower computing power.

Advantageously, the present invention allows network participants to collectively compute the result faster than one participant can compute it individually.

Advantageously, the present invention allows self-heating to be reduced in sensors used in blast-proof areas because the calculation generating waste heat can be performed remotely. Due to the split calculation, the self-heating of the individual sensor or actuator is lower.

According to one embodiment of the invention, it is provided that the partial arithmetic operations to be calculated locally and the partial arithmetic operations to be calculated remotely are calculated in parallel.

According to one embodiment of the invention, it is provided that the network interface device is an APL interface or a WLAN interface.

According to one embodiment of the invention, it is provided that the network interface device is adapted to be coupled to a network router and/or a network switch.

According to one embodiment of the invention, it is provided that the network interface device is adapted to send the partial computing operations to be computed remotely to the network and this comprises sending to one or more network subscribers.

According to one embodiment of the invention, it is provided that the network device further comprises an actuator device and the computing operations are used to compute signals for controlling the actuator device and preferably the actuator device may be, for example, an actuator, such as a switchable valve.

According to one embodiment of the invention, it is provided that the network device further comprises a sensor device and the computing operations are used to compute sensor signals of the sensor device. In this regard, the sensor device may be in the form of a sensor, such as a level sensor.

According to one embodiment of the invention, it is provided that the arithmetic operations are used to perform a self-diagnosis or a safety test.

Another aspect of the invention relates to a level measuring device, comprising: a network device according to the first aspect or according to an embodiment of the first aspect.

Another aspect of the invention relates to a method of distributing computing operations by data communication in a network.

As a first step, the network device is connected to the network.

As a second step, an arithmetic operation is divided into partial arithmetic operations to be calculated locally and partial arithmetic operations to be calculated remotely, and the partial arithmetic operations to be calculated locally are calculated and provided as locally calculated partial arithmetic operations.

As a third step, the partial arithmetic operations to be remotely calculated are sent to the network and received as remotely calculated partial arithmetic operations.

As a fourth step, a calculation of arithmetic operations is performed based on the remotely calculated partial arithmetic operations and the locally calculated partial arithmetic operations.

At this point, it should be noted that according to a further aspect of the invention, the features described above and below with respect to the field device or the apparatus may also be implemented as process steps.

Similarly, the method steps described above and below may be performed by certain embodiments of the field device or apparatus.

According to another aspect of the invention, there is disclosed a program element which, when executed on a processor of the field device or device, instructs the field device or network device to perform the steps described above and below.

According to another embodiment of the invention, there is disclosed a computer-readable medium on which a program element described above is stored.

The program element may be part of software stored on a processor. Furthermore, this embodiment of the invention comprises a program element which is subject to the method or individual method steps described above and below.

According to another embodiment of the invention, the network device may be implemented in a network formed as a distributed system as a distributed computing environment with a plurality of network participants.

According to another embodiment of the invention, the network formed as a distributed system may be a networked client-server system with a smartphone as a client having access to field devices or level measurement devices and to storage or processing resources in a computer cloud.

According to a further embodiment of the invention, the network may be formed as an interconnected heterogeneous or homogeneous computer network with a plurality of field devices or level measurement devices interacting via the computer network or, for example, also as an ad hoc network or networked via the Internet.

Further embodiments of the invention are described below with reference to the figures. Where the same reference signs are used in the following description of figures, these designate the same or similar elements. However, the same or similar elements can also be designated by different reference signs. The representations in the figures are schematic and not to scale.

DETAILED DESCRIPTION OF EMBODIMENTS

Figure 1:
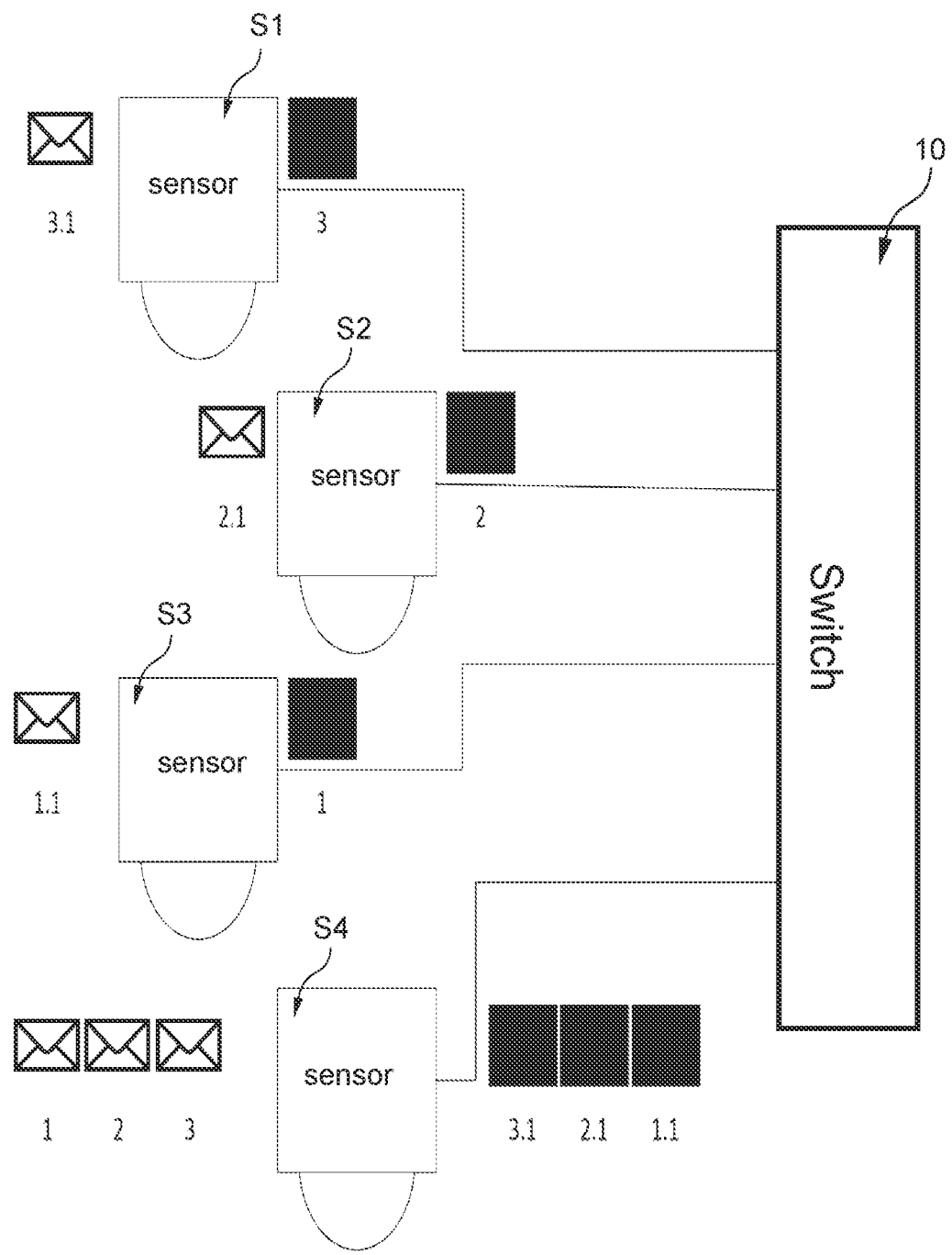
FIG. 1 shows a device for distributing computing operations by data communication in a network according to one embodiment of the invention.

FIG. 1 shows a device for distributing computing operations by data communication in a network according to one embodiment of the invention.

According to one embodiment of the invention, the following is provided:

APL, for example, brings high-bandwidth network technology to the field level of process plants. This makes it possible to equip sensors, S1, S2, S3, S4 (e.g., level sensors) and actuators (e.g., valves) with a network interface.

A switch 10 can be used to couple the network interfaces of the sensors or actuators to the network. The switch can be designed as a coupling element in computer networks that interconnects network segments.

According to one embodiment of the invention, the following is provided:

Due to the high bandwidth networking, the network nodes S1, S2, S3, S4 can exchange large amounts of data 1, 2, 3, 1.1, 2.1, and 3.1.

Due to the possibility of exchanging large amounts of data, raw data can be exchanged. This has the advantage that a network node does not perform the entire calculation operation itself, but splits the calculation operations and distributes them in the network for processing. The network nodes S1, S2, S3, and S4 calculate the partial results and send the calculated partial results back over the network. These calculated partial results are combined by the initiator to an overall result and output.

According to one embodiment of the invention, the following is also provided:

A measuring device for level measurement with radar technology is equipped with more than one antenna. Each antenna acts as a transmitter and receiver. Thus, each antenna must have its own data evaluation from the raw data. To make the calculation as fast and efficient as possible, the sensor sends the raw data of some antennas to one or more other sensors, which evaluate the raw data. The measuring sensor then receives the results of the evaluated raw data and calculates the exact level from the total result.

According to one embodiment of the invention, the following is provided:

A differential pressure sensor measures the differential pressure simultaneously with a measuring cell and the static pressure with another measuring cell. In addition, a temperature measurement can be read in. This temperature measurement can be internal or external. The raw data of the respective measuring cell must be standardized and converted in a calculation operation for further processing. The normalization of the measured values is outsourced to different sensors and combined in the measuring sensor to a complete result.

According to one embodiment of the invention, the following is provided:

In addition to the actual measurement task, a sensor must also perform other arithmetic operations. These are, e.g., a self-diagnosis or a safety test, e.g., access protection. The sensor sends the raw data required for self-diagnosis to one or more sensors. These one or more sensors then evaluate the raw data and return the result to the requesting sensor.

According to one embodiment of the invention, the following is provided:

A sensor calculates a main measured value from raw data. The same raw data is sent to one or more sensors, which also generate measured values from it using alternative algorithms. These measured values can be used to validate the main measured value and, if necessary, generate diagnostic data.

Figure 2:
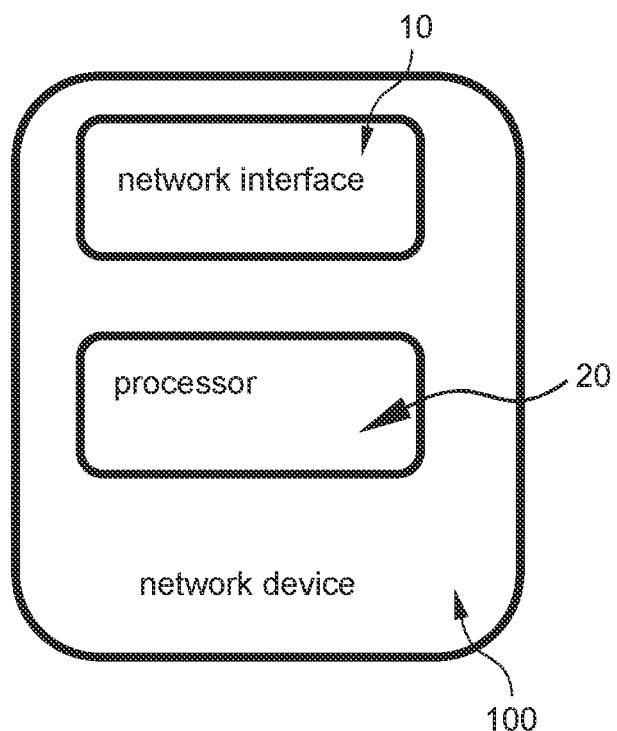
FIG. 2 shows a network device for distributing computing operations via data communication in a network according to one embodiment of the invention.

FIG. 2 shows a network device 100 for distributing computing operations via data communication in a network according to one embodiment of the invention. The network device 100 for distributing computing operations by data communication in a network includes a network interface device 10 and a processor device 20. The network interface device 10 is adapted to connect the network device 100 to the network. The network interface device 10 may be coupled to the processor device 20 via a network connection.

The processor device 20 is configured to divide an arithmetic operation into partial arithmetic operations to be calculated locally and partial arithmetic operations to be calculated remotely, and to calculate the partial arithmetic operations to be calculated locally and provide them as locally calculated partial arithmetic operations;

The network interface device 10 is configured to send the partial arithmetic operations to be remotely calculated to the network, and to receive the partial arithmetic operations as remotely calculated partial arithmetic operations.

The processor device 20 is further configured to calculate the arithmetic operations based on the remotely calculated partial arithmetic operations and the locally calculated partial arithmetic operations.

Figure 3:
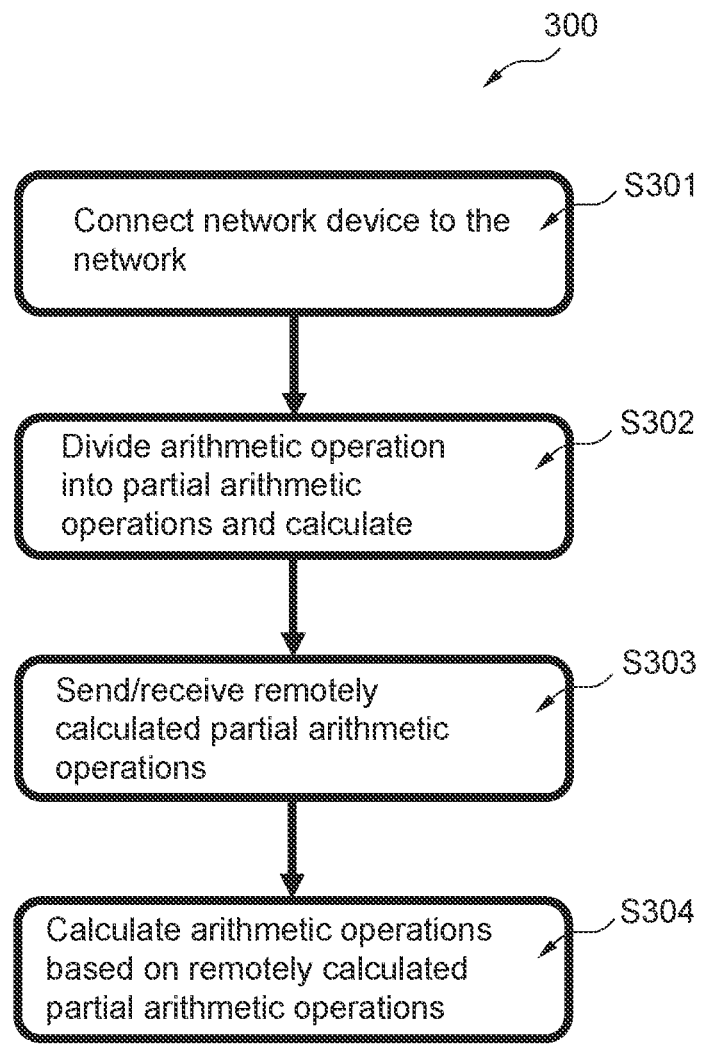
FIG. 3 shows a flowchart of a method for distributing computing operations via data communication in a network according to one embodiment of the invention.

FIG. 3 is a flowchart of a method 300 for distributing computing operations by data communication in a network according to one embodiment of the invention.

As a first step S301, a connection of the network device to the network is performed.

As a second step S302, an arithmetic operation is divided into partial arithmetic operations to be calculated locally and partial arithmetic operations to be calculated remotely, and these partial arithmetic operations to be calculated locally and to be provided as locally calculated partial arithmetic operations are calculated.

As a third step S303, the partial arithmetic operations to be remotely calculated are sent to the network and received as remotely calculated partial arithmetic operations.

As a fourth step S304, the arithmetic operations are calculated based on the remotely calculated partial arithmetic operations and the locally calculated partial arithmetic operations.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A level sensor configured to measure a level, the level sensor comprising a network device for distributing computing operations via data communication in a network, the network device comprising:
    an APL or WLAN network interface device configured to connect the network device to the network; and
    a processor device configured to divide an arithmetic operation into partial arithmetic operations to be calculated locally and partial arithmetic operations to be calculated remotely, to locally calculate the partial arithmetic operations to be calculated locally, and to provide them as locally calculated partial arithmetic operations,
    wherein the network interface device is further configured to send the partial arithmetic operations to be calculated remotely to the network and to receive them as remotely calculated partial arithmetic operations,
    wherein the processor device is further configured to calculate the arithmetic operation based on the remotely calculated partial arithmetic operations and the locally calculated partial arithmetic operations, resulting in the measured level, and
    wherein the partial arithmetic operations to be calculated locally and the partial arithmetic operations to be calculated remotely are calculated in parallel.

2. The level sensor device according to claim 1, wherein the APL or WLAN network interface device is further configured to be coupled to a network router and/or a network switch.

3. The level sensor device according to claim 1, wherein the APL or WLAN network interface device is further configured to send the partial computing operations to be computed remotely to the network and to one or more network subscribers.

4. The level sensor device according to claim 1,
    further comprising an actuator device,
    wherein computing operations are to compute signals for driving the actuator device.

5. The level sensor device according to claim 1,
    further comprising a sensor device,
    wherein computing operations are to compute sensor signals of the sensor device.

6. The level sensor device according to claim 1, wherein computing operations are to perform a self-diagnosis or a security test.

7. A computer network, comprising a plurality of level sensors according to claim 1.

8. The level sensor according to claim 1, configured to measure a level using radar technology, the level sensor comprising:
    a first antenna and a second antenna, each of the first and the second antennas acting as a transmitter and as a receiver,
    wherein a first partial arithmetic operation to be calculated locally relates to raw data received by the first antenna, and
    wherein a second partial arithmetic operation to be calculated remotely relates to raw data received by the second antenna.

9. A method of distributing computing operations by data communication in a network, the method comprising the following steps:
    connecting a network device of a level sensor configured to measure a level to the network via an APL or WLAN network interface device of the network device;
    dividing an arithmetic operation into partial arithmetic operations to be calculated locally and partial arithmetic operations to be calculated remotely, and calculating the partial arithmetic operations to be calculated locally and as locally calculated partial arithmetic operations;
    sending, via the APL or WLAN network interface device of the network device, the partial arithmetic operations to be calculated remotely to the network and receiving the remotely calculated partial arithmetic operations via the APL or WLAN network interface device, wherein the partial arithmetic operations to be calculated locally and the partial arithmetic operations to be calculated remotely are calculated in parallel; and
    calculating, by a processor device of the level sensor, the arithmetic operation based on the remotely calculated partial arithmetic operations and the locally calculated partial arithmetic operations, resulting in the measured level.

10. A nontransitory computer-readable storage medium comprising instructions stored therein, which, when executed by a computer, cause the computer to perform the steps of the method of claim 9.

* * * * *